US007734874B2

(12) United States Patent
Zhang et al.

(10) Patent No.: US 7,734,874 B2
(45) Date of Patent: Jun. 8, 2010

(54) METHOD AND SYSTEM FOR CACHING DATA USING FUTURE ACCESS REQUEST INFORMATION

(75) Inventors: Junbiao Zhang, Bridgewater, NJ (US); Jun Li, Plainsboro, NJ (US); Snigdha Verma, Somerset, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 301 days.

(21) Appl. No.: 11/664,563

(22) PCT Filed: Oct. 6, 2004

(86) PCT No.: PCT/US2004/032820

§ 371 (c)(1),
(2), (4) Date: Apr. 3, 2007

(87) PCT Pub. No.: WO2006/041471

PCT Pub. Date: Apr. 20, 2006

(65) Prior Publication Data

US 2008/0086607 A1    Apr. 10, 2008

(51) Int. Cl.
*G06F 12/08* (2006.01)
(52) U.S. Cl. .................................. 711/133; 711/137
(58) Field of Classification Search ................ 711/133, 711/137, 160
See application file for complete search history.

(56) References Cited

U.S. PATENT DOCUMENTS

| 5,495,457 | A | 2/1996 | Takagi |
| 5,519,846 | A | 5/1996 | Swenson |
| 6,209,062 | B1 | 3/2001 | Boland et al. |
| 6,272,598 | B1 | 8/2001 | Arlitt et al. |
| 6,470,423 | B1 | 10/2002 | Ho et al. |
| 6,721,490 | B1 | 4/2004 | Yao et al. |
| 6,721,850 | B2 | 4/2004 | Hofmann et al. |
| 6,772,225 | B1 * | 8/2004 | Jennings et al. ............. 709/240 |
| 7,035,980 | B2 * | 4/2006 | Kurokawa et al. .......... 711/137 |
| 2002/0120818 | A1 * | 8/2002 | Hofmann et al. ............ 711/133 |
| 2002/0194432 | A1 | 12/2002 | Rodriguez |
| 2003/0195940 | A1 | 10/2003 | Basu et al. |

FOREIGN PATENT DOCUMENTS

| JP | 7254204 | 10/1995 |
| WO | WO 02/39285 | 5/2002 |

OTHER PUBLICATIONS

Megiddo, Nimrod; Modha, Dharmendra. "ARC: A Self-Tuning, Low Overhead Replacement Cache." Proceedings of FAST '03: 2nd USENIX Conference on File and Storage Technologies. USENIX Association, 2003. pp. 115-130.*
Search Report dated Sep. 14, 2006.

* cited by examiner

*Primary Examiner*—Pierre-Michel Bataille
(74) *Attorney, Agent, or Firm*—Robert D. Shedd; Joseph J. Opalach; Reitseng Lin

(57) ABSTRACT

A method and system for caching data such as audio, video and/or other data uses information including future access request information for improved caching performance. According to an exemplary embodiment, a cache system includes a cache operative to cache a plurality of data items. A processor is operative to enable at least one of the data items in the cache to be replaced using future access request information for the at least one data item.

21 Claims, 3 Drawing Sheets

METHOD AND SYSTEM FOR CACHING DATA USING FUTURE ACCESS REQUEST INFORMATION

This application claims the benefit, under 35 U.S.C. 365 of International Application PCT/US2004/032820, filed Oct. 6, 2004, which was published in accordance with PCT Article 21(2) on 20 Apr. 2006 in English.

BACKGROUND OF THE INVENTION

1. Field of the Invention

The present invention generally relates to a technique for caching data such as audio, video and/or other data, and more particularly, to a method and system for caching data that uses information including future access request information for improved caching performance.

2. Background Information

Data caching is important to various aspects of computer systems such as memory systems, file systems, and internet (i.e., web) systems. The basic concept of data caching is to place data that is more likely to be accessed in the near future in a limited capacity, but relatively fast and expensive, cache storage element that is "closer" to the end user(s). Because of the limited cache storage capacity, the core of any cache system is its replacement algorithm which dictates what data item(s) should be removed from the cache when the cache is full and it is necessary to bring in a new data item.

Since data access sequences may not be known beforehand, existing caching techniques use replacement algorithms that are based on past access information. One existing replacement algorithm known as the "Least Recent Used" (LRU) algorithm is based on the assumption that once a data item is accessed it is likely to be accessed again in the future. Accordingly, with the LRU algorithm, the cached data item that was least recently accessed is replaced first. The LRU algorithm may, for example, be particularly applicable to memory and file systems. Another existing replacement algorithm known as the "Least Frequently Used" (LFU) algorithm is based on the assumption that a data item that was accessed frequently in the past is likely to be accessed again in the future. Accordingly, with the LFU algorithm, the cached data item that was accessed the fewest times in the past is replaced first. The LFU algorithm may, for example, be particularly applicable to internet or web-based systems.

While existing replacement algorithms such as the aforementioned LRU and LFU algorithms are beneficial for certain applications, they are also deficient in that they use only past access information and do not take future access information into account. Accordingly, there is a need for a technique for data caching that uses information including future access request information for improved caching performance. The present invention addresses these and/or other issues.

SUMMARY OF THE INVENTION

In accordance with an aspect of the present invention, a method for operating a cache system is disclosed. According to an exemplary embodiment, the method comprises steps of receiving a plurality of data items in a cache of the cache system, and replacing at least one of the data items in the cache using future access request information for the at least one data item.

In accordance with another aspect of the present invention, a data processing apparatus is disclosed. According to an exemplary embodiment, the data processing apparatus comprises caching means for caching a plurality of data items. Processing means enable at least one of the data items in the caching means to be replaced using future access request information for the at least one data item.

In accordance with yet another aspect of the present invention, a cache system is disclosed. According to an exemplary embodiment, the cache system comprises a cache operative to cache a plurality of data items. A processor is operative to enable at least one of the data items in the cache to be replaced using future access request information for the at least one data item.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Figure 1:
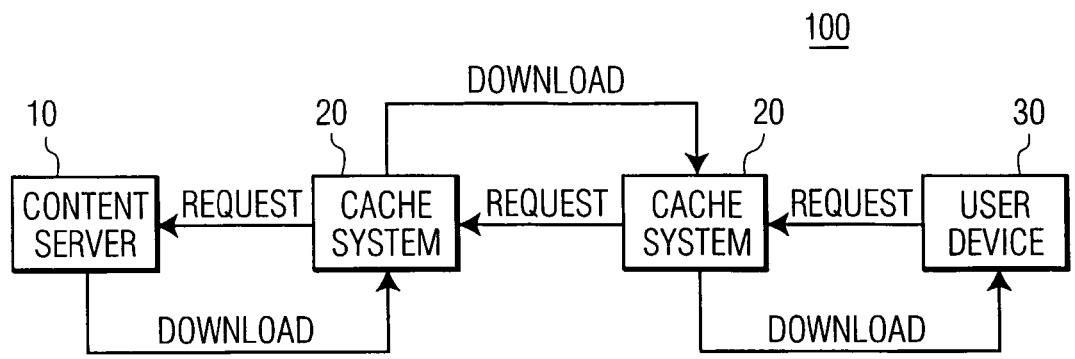
FIG. 1 is a diagram of an exemplary environment suitable for implementing the present invention.

Referring now to the drawings, and more particularly to FIG. 1, an exemplary environment 100 suitable for implementing the present invention is shown. As shown in FIG. 1, environment 100 comprises a content server 10, one or more cache systems 20, and a user device 30. According to an exemplary embodiment, environment 100 represents a network capable of distributing audio, video and/or other data from content server 10 to user device 30 via cache systems 20.

Content server 10 is operative to store and distribute data. According to an exemplary embodiment, content server 10 is operative to store data including audio, video and/or other data, and to distribute such data by downloading it to one or more user devices including user device 30 via cache systems 20 responsive to request signals. The data stored and distributed by content server 10 may be referred to herein as "data items" and each such data item may for example represent audio and/or video content such as a movie, a song, or the like.

Cache systems 20 are each operative to perform data processing functions including a data caching function. According to an exemplary embodiment, each cache system 20 is operative to cache audio, video and/or other data downloaded from one or more data sources including content server 10 and/or other cache systems 20, and to provide cached data to one or more user devices including user device 30 responsive to request signals. For purposes of example and explanation, environment 100 of FIG. 1 is shown with two cache systems 20. However, a lesser or greater number of such cache systems 20 may be used according to the present invention. Accordingly, the actual number of cache systems 20 used in practice may be a matter of design choice. Also according to an exemplary embodiment, each cache system 20 uses information including future access request information for improved caching performance. Further details regarding each cache system 20 will be provided later herein.

User device 30 is operative to generate the request signals that cause data such as audio, video and/or other data to be downloaded from one or more data sources including content server 10 and/or cache system(s) 20, and to receive and process the resultant downloaded data. According to an exemplary embodiment, user device 30 may be embodied as any type of device, apparatus, or system capable of generating request signals for data items and receiving the requested data items. For example, user device 30 may be embodied as any type of consumer electronics device such as, but not limited to, television set, computer, set-top box, video cassette recorder (VCR), digital versatile disk (DVD) player, video game box, personal video recorder (PVR), or other device. User device 30 may include an input element such as a handheld remote control device, wired and/or wireless keyboard, or other input element through which users may provide inputs that cause user device 30 to generate the request signals. User device 30 may have an integrated display device, and/or be operatively coupled to an associated display device.

Figure 2:
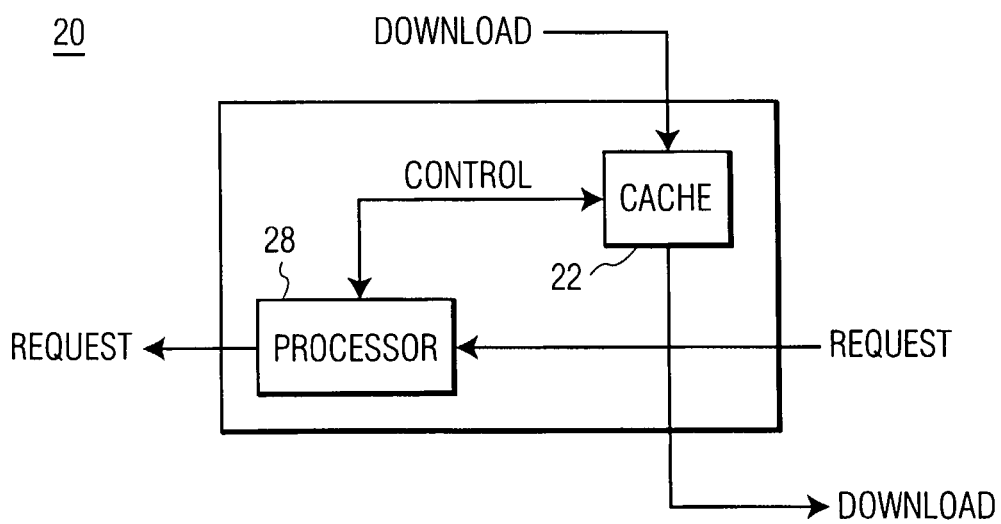
FIG. 2 is a block diagram illustrating further exemplary details of each cache system of FIG. 1.

Referring to FIG. 2, a block diagram illustrating further exemplary details of each cache system 20 of FIG. 1 is shown. As shown in FIG. 2, each cache system 20 comprises caching means such as cache 22 and processing means such as processor 28. The foregoing elements of FIG. 2 may be embodied using one or more integrated circuits (ICs). For clarity of description, certain conventional elements associated with cache system 20 such as power signals and/or other elements may not be shown in FIG. 2.

Cache 22 is operative to perform a data caching function of cache system 20. According to an exemplary embodiment, cache 22 is operative to cache data including audio, video and/or other data downloaded from one or more data sources such as content server 10 and/or other cache systems 20 under the control of processor 28. Also according to an exemplary embodiment, cache 22 is operative to download cached data including audio, video and/or other data to other cache systems 20 and/or user device 30 under the control of processor 28.

Processor 28 is operative to perform various processing functions of cache system 20. According to an exemplary embodiment, processor 28 is operative to receive and process request signals provided from another cache system 20 and/or user device 30 to effectuate a data downloading function. As indicated in FIG. 2, processor 28 may respond to a received request signal by generating an additional request signal that is provided to content server 10 and/or another cache system 20 and thereby causes one or more requested data items to be downloaded into cache 22.

Processor 28 is also operative to execute a replacement algorithm that enables data items in cache 22 to be replaced. According to an exemplary embodiment, processor 28 is operative to provide control signals that enable one or more data items in cache 22 to be replaced using future access request information for the one or more data items. According to this exemplary embodiment, each data item stored in cache 22 may include future access request information indicating a time at which the particular data item has been requested for future access. The future access time for a given data item may be based on an advance user request for the given data item. As will be described later herein, processor 28 may cause the data items in cache 22 having the farthest future access times to be replaced first. Moreover, processor 28 may also use past access information for data items when implementing the replacement algorithm. According to an exemplary embodiment, such past access information for a given data item may include a number of times the given data item has been previously accessed, and/or the last time the given data item has been previously accessed. Further details regarding these aspects of the present invention will be provided later herein.

Figure 3:
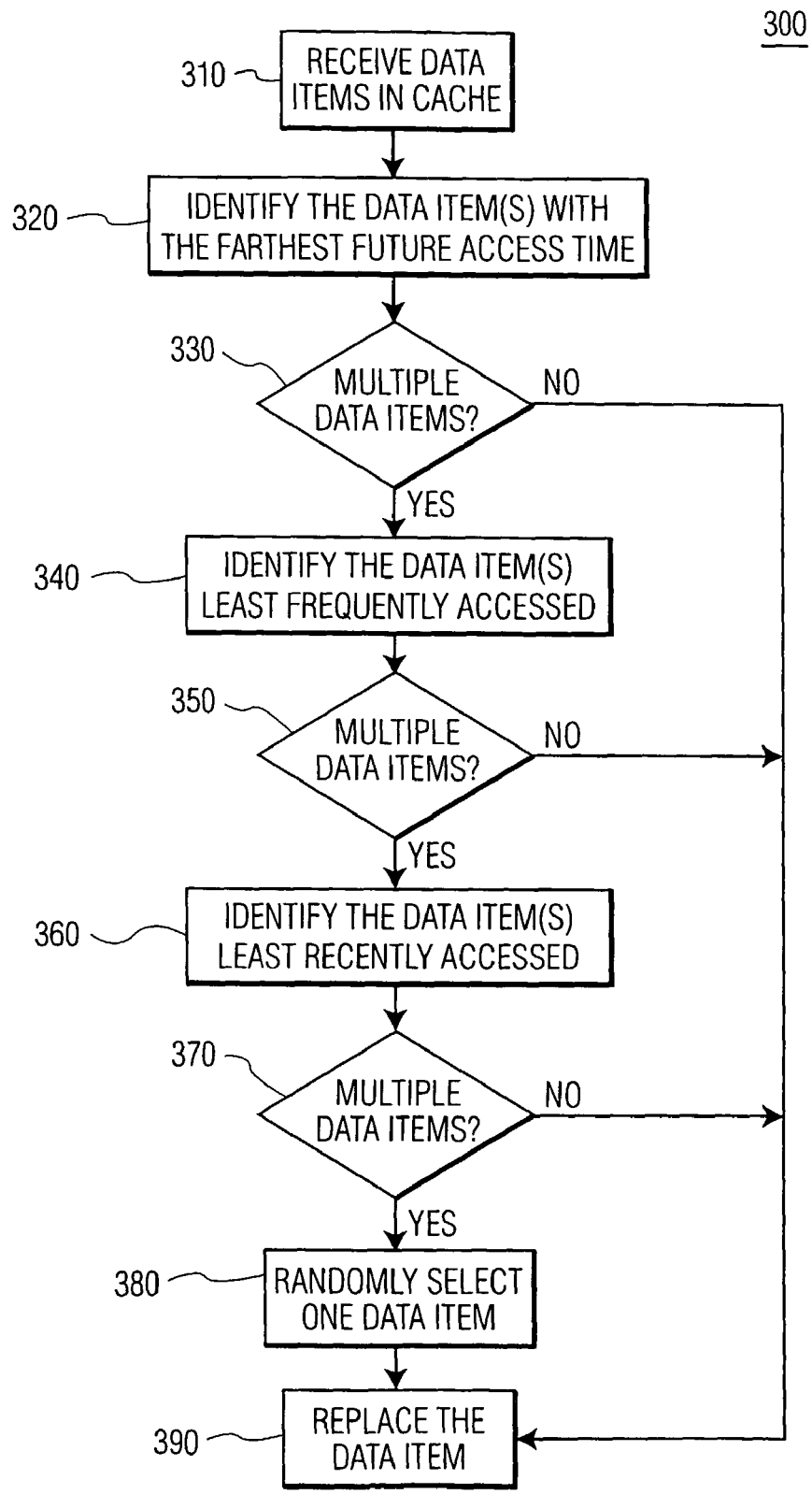
FIG. 3 is a flowchart illustrating steps according to an exemplary embodiment of the present invention.

To facilitate a better understanding of the present invention, an example will now be provided. Referring to FIG. 3, a flowchart 300 illustrating steps according to an exemplary embodiment of the present invention is shown. For purposes of example and explanation, the steps of FIG. 3 will be described with reference to the elements of environment 100 of FIG. 1 and cache system 20 of FIG. 2. The steps of FIG. 3 are exemplary only, and are not intended to limit the present invention in any manner.

At step 310, a plurality of data items is placed in a cache 22 of a corresponding cache system 20. According to an exemplary embodiment, the data items are downloaded into cache 22 from a data source such as content server 10 or another cache system 20 responsive to a user request signal. The data items may include audio, video and/or other data representing, for example, movies, songs, or other content. Also according to an exemplary embodiment, each data item $C_i$ placed in cache 22 at step 310 includes at least three pieces of information: $f_i$, $n_i$, and $p_i$, each represented by a corresponding value. The first piece of information, $f_i$, represents the first future access time for data item $C_i$. In other words, the first future access time $f_i$ indicates the next future time at which data item $C_i$ has been requested for access. If no future access information is available for a given data item $C_i$, then $f_i$ is set to infinity. This may occur, for example, if a data item $C_i$ is downloaded to cache 22 and there is no future request for data item $C_i$. The second piece of information, $n_i$, represents the number of times data item $C_i$ has been previously accessed. The third piece of information, $p_i$, represents the latest access time for data item $C_i$.

At step 320, the data item(s) having the farthest future access time is identified. According to an exemplary embodiment, processor 28 performs step 320 by examining the first future access time $f_i$ of each of the data items in cache 22. According to this exemplary embodiment, the one or more data items in cache 22 having the largest $f_i$ value are identified by processor 28 at step 320.

At step 330, a determination is made as to whether multiple data items are identified at step 320. According to an exemplary embodiment, processor 28 performs step 330 by determining whether a plurality of data items in cache 22 are tied for having the largest $f_i$ value. If the determination at step 330 is negative, then process flow advances to step 390 where the single data item identified at step 320 is replaced with a new data item. According to an exemplary embodiment, processor 28 provides one or more control signals to cache 22 to effectuate the replacement of the data item at step 390.

Alternatively, if the determination at step 330 is positive, then process flow advances to step 340 where the least frequently accessed data item(s) among the multiple data items identified at step 320 is identified. According to an exemplary embodiment, processor 28 performs step 340 by examining the multiple data items identified at step 320, and identifying one or more of those data items having the smallest $n_i$ value.

At step 350, a determination is made as to whether multiple data items are identified at step 340. According to an exemplary embodiment, processor 28 performs step 350 by determining whether a plurality of data items examined at step 340 are tied for having the smallest $n_i$ value. If the determination at step 350 is negative, then process flow advances to step 390 where the single data item identified at step 340 is replaced with a new data item. According to an exemplary embodiment, processor 28 provides one or more control signals to cache 22 to effectuate the replacement of the data item at step 390.

Alternatively, if the determination at step 350 is positive, then process flow advances to step 360 where the least recently accessed data item(s) among the multiple data items identified at step 340 is identified. According to an exemplary embodiment, processor 28 performs step 360 by examining the multiple data items identified at step 340, and identifying one or more of those data items having the smallest $p_i$ value.

At step 370, a determination is made as to whether multiple data items is identified at step 360. According to an exemplary embodiment, processor 28 performs step 370 by determining whether a plurality of data items examined at step 360 are tied for having the smallest $p_i$ value. If the determination at step 370 is negative, then process flow advances to step 390 where the single data item identified at step 360 is replaced with a new data item. According to an exemplary embodiment, processor 28 provides one or more control signals to cache 22 to effectuate the replacement of the data item at step 390.

Alternatively, if the determination at step 370 is positive, then process flow advances to step 380 where one data item in cache 22 is randomly selected, and replaced at step 390 under the control of processor 28 as previously described herein. According to an exemplary embodiment, processor 28 selects the last data item in cache 22 at step 380, although different selection criteria could also be used at step 380.

The steps of FIG. 3 described above can be carried out by arranging data items in cache 22 in a prescribed order, and then replacing the last data item in the order when a new data item is received. This prescribed order of data items is as follows: All of the data items in cache 22 are arranged in an increasing order first based on the above-described $f_i$ value (i.e., the largest last). In the event that more than one data item has the same $f_i$ value (e.g., two data items with infinity values are considered as having equal values), then those data items having the same $f_i$ value are arranged in decreasing order based on the above-described $n_i$ value (i.e., the smallest last). In the event that more than one data item has the same $n_i$ value, then those data items having the same $n_i$ value are arranged in decreasing order based on the above-described $p_i$ value (i.e., the smallest last). Finally, if there are remaining data items having equal $p_i$ values, then those remaining data items are arranged in random order. When a replacement has to be made, the last data item in the order is replaced.

Figure 4:
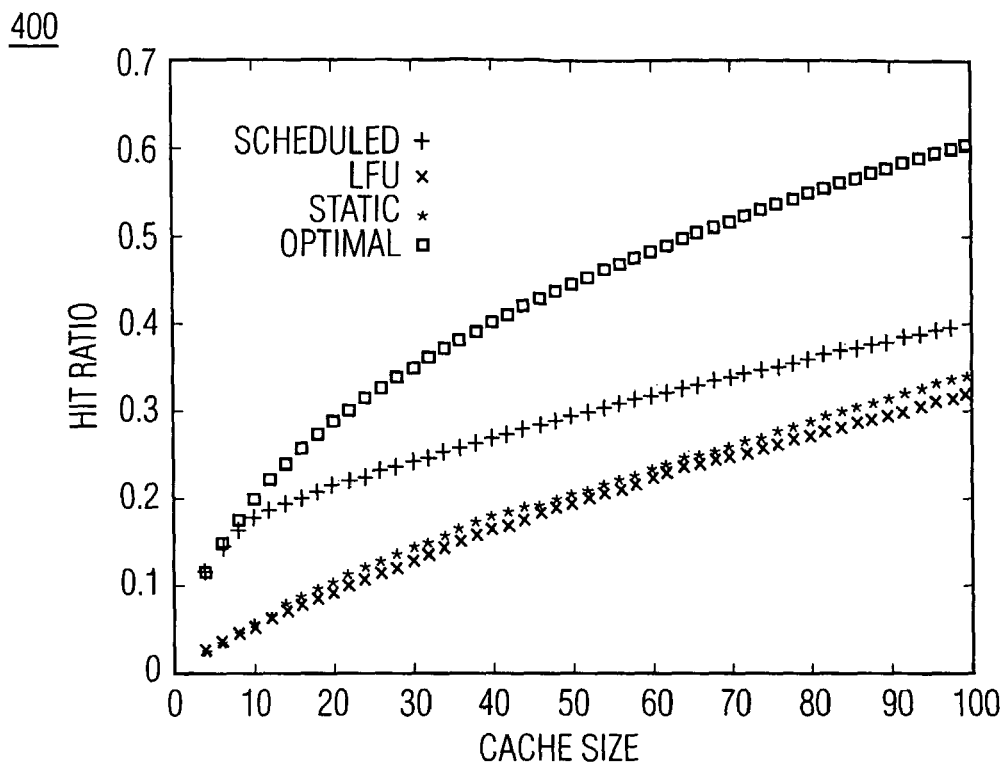
FIG. 4 is a graph illustrating hit ratios of different replacement algorithms with different cache sizes.
Figure 5:
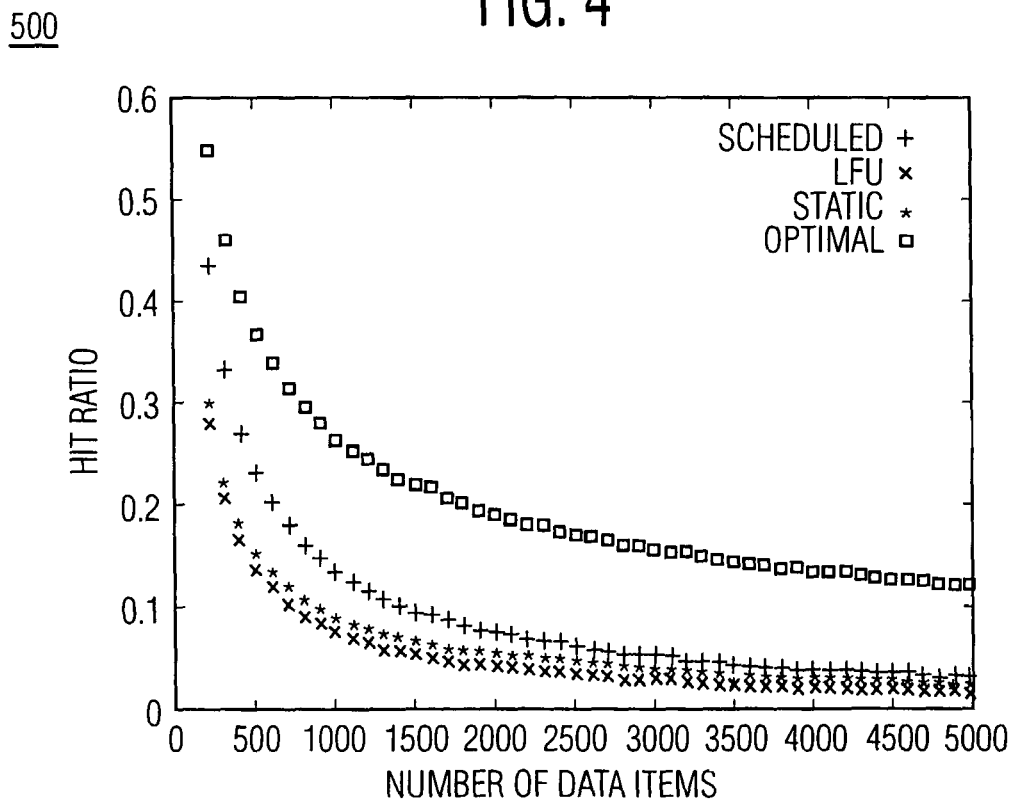
FIG. 5 is a graph illustrating hit ratios of different replacement algorithms for different numbers of data items.

Referring now to FIGS. 4 and 5, simulation results for the replacement algorithm of FIG. 3 are shown. These simulation results show that the replacement algorithm of FIG. 3 provides better results than certain existing replacement algorithms. One important parameter for any cache system is the "hit ratio" which refers to the ratio between the number of times a particular data item is accessed and the total number of accesses. FIG. 4 is a graph 400 illustrating hit ratios of different replacement algorithms with different cache sizes (numbers along x-axis indicate the storage capacity of cache assuming uniformly sized data items). FIG. 5 is a graph 500 illustrating hit ratios of different replacement algorithms for different numbers of data items in the cache.

The simulation results shown in FIGS. 4 and 5 are based on a video downloading scenario in which users make requests for videos and download them at a later time. The access pattern of these videos is based on the known Zipf distribution which is frequently used to describe video rentals, library book check-outs, and the like. The request arrival is based on a Poisson distribution with the mean arrival interval set to 3 minutes, and the delay time is based on a normal distribution with the mean time set to 3 hours. In addition to the replacement algorithm of FIG. 3 (referred to as "scheduled"), FIGS. 4 and 5 show the results of the LFU algorithm which has been previously described herein, the static algorithm which places the most popular data items in the cache a priori, and the optimal algorithm which produces the maximum achievable hit ratio. As shown from FIGS. 4 and 5, the replacement algorithm of FIG. 3 yields consistently higher hit ratios than other realistic replacement algorithms, especially when the total number of different data items is relatively small (e.g., less than 2000—see FIG. 5).

As described herein, a method and system for caching data such as audio, video and/or other data uses information including future access request information for improved caching performance. While this invention has been described as having a preferred design, the present invention can be further modified within the spirit and scope of this disclosure. For example, the present invention may be applied to cache systems that use future access request information in ways other than that expressly described herein. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for operating a cache system by receiving a plurality of data items in a cache of said cache system and replacing at least one of said data items in said cache according to an algorithm, said algorithm comprising steps of:
   (a) identifying one or more of said data items in said cache according to future access request information indicating a time at which said one or more of said data items is scheduled for future access;
   (b) if more than one of said data items is identified at step (a), identifying one or more of said data items identified at step (a) according to a first type of past access information;
   (c) if more than one of said data items is identified at step (b), identifying one or more of said data items identified at step (b) according to a second type of past access information different from said first type of past access information; and
   (d) if more than one of said data items is identified at step (c), randomly selecting one of said data items in said cache and replacing said randomly selected data item.

2. The method of claim 1, wherein said future access request information includes a farthest future access time and if only one of said data items is identified at step (a), further comprising a step of replacing said data item identified at step (a).

3. The method of claim 1, wherein said first type of past access information includes frequency information and if only one of said data items is identified at step (b), further comprising a step of replacing said data item identified at step (b).

4. The method of claim 1, wherein said second type of past access information includes recency information and if only one of said data items is identified at step (c), further comprising a step of replacing said data item identified at step (c).

5. The method of claim 1, wherein said at least one data hem includes video data.

6. The method of claim 1, wherein said at least ones data hem includes audio data.

7. The method of claim 1, wherein said randomly selected data item is a last data item in said cache.

8. A data processing apparatus, comprising:
means for caching a plurality of data items; and
means for enabling at least one of said data items in said caching means to be replaced according to an algorithm, said algorithm comprising steps of:
(a) identifying one or more of said data items in said caching means according to future access request information indicating a time at which said one or more of said data items is scheduled for future access;
(b) if more than one of said data items is identified at step, (a), identifying one or more of said data items identified at step (a) according to a first type of past access information;
(c) if more than one of said data items is identified at step (b), identifying one or more of said data items identified at step (b) according to a second type of past access information different from said first type of past access information; and
(d) if more than one of said data items is identified at step (c), randomly selecting one of said data items in said caching means and replacing said randomly selected data item.

9. The data processing apparatus of claim 8, wherein said future access request information includes a farthest future access time and only one of said data items is identified at step (a), further comprising a step of replacing said data item identified at step (a).

10. The data processing apparatus of claim 8, wherein said first type of past access information includes frequency information and if only one of said data items is identified at step (b), further comprising a step of replacing said data item identified at step (b).

11. The data processing apparatus of claim 8, wherein said second type of past access information includes recency information and if only one of said data items is identified at step (c), further comprising a step of replacing said data item identified at step (c).

12. The data processing apparatus of claim 8, wherein said at least one data item includes video data.

13. The data processing apparatus of claim 8, wherein said at least one data item includes audio data.

14. The data processing apparatus of claim 8, wherein said randomly selected data item is a last data item in said caching means.

15. A cache system, comprising:
a cache operative to cache a plurality of data items; and
a processor operative to enable at least one of said data items in said cache to be replaced according to an algorithm, said algorithm comprising steps of:
(a) identifying one or more of said data items in said cache according to future access request information indicating a time at which said one or more of said data items is scheduled for future access;
(b) if more than one of said data items is identified at step (a), identifying one or more of said data items identified at step (a) according to a first type of past access information;
(c) if more than one of said data items is identified at step (b), identifying one or more of said data items identified at step (b) according to a second type of past access information different from said first type of past access information; and
(d) if more than one of said data items identified at step (c), randomly selecting one of said data items in said cache and replacing said randomly selected data item.

16. The cache system of claim 15, wherein said future access request information includes a farthest future access time and if only one of said data items is identified at step (a), further comprising a step of replacing said data item identified at step (a).

17. The cache system of claim 15, wherein said first type of past access information includes frequency information and if only one of said data items is identified at step (b), further comprising a step of replacing said data item identified at step (b).

18. The cache system of claim 15, wherein said second type of past access information includes recency information and if only one of said data items is identified at step (c), further comprising a step of replacing said data item identified at step (c).

19. The cache system of claim 15, wherein said at least one data item includes video data.

20. The cache system of claim 15, wherein said at least one data item includes audio data.

21. The cache system of claim 15, wherein said randomly selected data item is a last data item in said cache.

* * * * *